United States Patent [19]
Swensen

[11] Patent Number: 5,840,356
[45] Date of Patent: Nov. 24, 1998

[54] SHELF-STABLE FRUIT PUREE AND METHOD OF PREPARATION

[75] Inventor: Bert F. Swensen, Columbus, Miss.

[73] Assignee: The Network Group, Inc., Jackson, Miss.

[21] Appl. No.: 914,572

[22] Filed: Aug. 14, 1997

[51] Int. Cl.$^6$ .............................. A23B 1/22; A23L 1/27; A23C 9/14
[52] U.S. Cl. ..................... 426/262; 426/324; 426/326; 426/395; 426/399; 426/615
[58] Field of Search ..................... 426/395, 399, 426/524, 521, 330.5, 333, 324, 326, 262, 615

[56] References Cited

U.S. PATENT DOCUMENTS

| | | | |
|---|---|---|---|
| 3,846,570 | 11/1974 | Vetter et al. | 426/399 |
| 3,961,088 | 6/1976 | Besand et al. | 426/262 |
| 4,336,273 | 6/1982 | Lee | 426/321 |
| 4,562,085 | 12/1985 | Ruggiero | 426/599 |
| 4,828,866 | 5/1989 | Wade et al. | 426/599 |
| 5,389,387 | 2/1995 | Zuniga et al. | 426/74 |
| 5,417,998 | 5/1995 | Scheibner et al. | 426/615 |
| 5,576,046 | 11/1996 | Ellis | 426/615 |

OTHER PUBLICATIONS

Sofos, J.N. *Sorbate Food Preservatives*. CRC Press, Florida 1989, 55–84.

*Primary Examiner*—Nina Bhat
*Attorney, Agent, or Firm*—Quarles & Brady

[57] ABSTRACT

Frozen fruit of at least one type is slowly thawed by refrigeration over a defined period of time, and then combined with a mix of 0.056% to 0.058% by weight of preservatives dissolved in purified water, 0.0% to 3.70% of natural sweetener or sweeteners, sufficient edible acid to give a pH range of about 2.3 to 3.8, and sufficient amounts of flavoring and coloring agent to give the desired flavor, color and consistency in the final product. The final fruit puree product has a brix value in the range of 6.0 to 25.0 which is a shelf-stable, ready to use fruit puree that does not require refrigeration.

18 Claims, No Drawings

SHELF-STABLE FRUIT PUREE AND METHOD OF PREPARATION

FIELD OF THE INVENTION

The present invention relates, in general, to fruit puree, and in particular to a shelf-stable fruit puree which remains stable for extended periods of time, and to a method of making such puree.

BACKGROUND OF THE INVENTION

There are individual frozen fruits and fruit purees, as well as aseptically packaged fruit purees, presently on the market which are suitable for use as flavoring for foods such as yogurts, smoothies, and frozen drinks. However, these fruit purees must be stored frozen and thawed before use, necessitating additional preparation time.

Another concern is the degree of processing generally required to produce and preserve a fruit puree. Typically, fruit products are preserved using a combination of chemical preservatives and heat pasteurization. The heat pasteurization enhances the preservatives' inhibition of microbial growth. However, increased temperatures can impart heat stress on the food product, reducing its integrity. Moreover, heating the treated product necessitates additional processing time.

Finally, using frozen whole fruits or fruit purees as flavoring in foods can be an inefficient process, due to the time required to thaw these frozen products. Moreover, as frozen products thaw they may separate out in a non-uniform manner, necessitating mixing. If frozen fruit or fruit purees are not used within approximately eight hours after thawing, these products begin to brown and are likely to spoil, resulting in waste.

SUMMARY OF THE INVENTION

The present invention relates to a shelf-stable fruit puree and the method for preparing said puree. To prepare the puree, frozen fruit of at least one type is slowly thawed in a refrigerated environment for a defined period of time, and then immediately combined with a premix of preservatives dissolved in water. No heating is required to inhibit microbial activity. Sufficient sweeteners are added to give said puree the desired brix value, sufficient edible acid to give a pH range of about 2.3 to 3.8, and sufficient amounts of flavoring and coloring agents to give the desired flavor, color and consistency in the final product are then added. The final fruit puree product has a brix value in the range of 6.0 to 25.0 and is stable without refrigeration for at least 90 days.

It is an object of the present invention to provide a shelf-stable fruit puree ready for use and having a brix value in the range of 6.0 to 25.0.

It is another object of this invention to provide a shelf-stable fruit puree that requires no thawing before its use.

It is yet another object of this invention to provide a shelf-stable fruit puree that requires no refrigeration for storage, and can be stored for at least 90 days at a temperature of 70° F. or below.

It is a further object of this invention to produce a shelf-stable fruit puree without the need to use heat in the production process. By slowly thawing frozen fruit in a refrigerated environment over a defined period of time, then subsequently treating the said fruit with a combination of potassium sorbate and sodium benzoate at the proper pH, the additional step of heating the puree mix becomes unnecessary.

It is another aspect of this invention to provide a shelf-stable fruit puree which, after packaging, can be more easily portioned than whole fruit when used as an ingredient in a final product.

It is another aspect of the present invention to prevent waste and product loss arising from storage of frozen purees that are thawed but then not used immediately after thawing.

DETAILED DESCRIPTION OF THE INVENTION

The fruit puree of the present invention contains at least one type of fruit and may also contain fruit and fruit juice concentrate, depending on the desired taste and texture of the final product. Specific types of fruit which can be utilized in the present invention include fruit juice, concentrated fruit juice, fruit puree and fruit puree concentrate. Examples of a few of the many specific types of fruit which can be utilized in this invention include apricots, blueberries, blackberries, boysenberries, cherries, guavas, kiwis, mangos, papayas, peaches, pineapples, strawberries and raspberries.

The preferred process for preparing the fruit puree is described below.

Whole fruits used in this invention are rapidly frozen just after harvest. The fruits may be sliced and pureed prior to freezing and shipment, or they may be frozen in the form of whole fruit. All fruits and fruit juice concentrates are kept frozen in their original containers until the time of processing. Note that, although using frozen fruit is the preferred method of the invention, fresh fruit could be used as a starting product.

Slow Thaw

To help maintain the microbial stability of the puree, the frozen fruit starting product is slowly thawed in a refrigerated environment, with a temperature ranging from 40° to 50° F. During this period of thawing, the fruit is kept in its original, unopened container. In the preferred embodiment of the present invention, the period of thawing generally varies from eight to ten days, depending upon the type of fruit and its packaging. However, this time period could be as short as 2 days, or as long as 15 days. For example, a 55 gallon drum of strawberries requires 9 days sof refrigeration at 40–50° F. to thaw. The fruit remains in the refrigerated environment until it is added to the premix of preservatives and sweeteners. Note that if fresh fruits were used in the invention, rather than frozen fruits, the slow thaw step would be omitted.

Preservatives

The preservatives sodium benzoate and potassium sorbate are used in the present invention to prevent microbial growth and spoilage. Sodium benzoate ($C_7H_5NaO_2$), a bacterial inhibitor, is a salt form of benzoic acid, and is generally used in food products in powdered or granule form, in quantities of not more than 1 unit in 1000. Potassium sorbate ($C_6H_7KO_2$), an inhibitor of yeasts and molds, is a potassium salt of sorbic acid, and generally is used in food products in powdered or granular form, Sodium benzoate and potassium sorbate are frequently used in combination to preserve food products because they expand the range of microorganisms inhibited at lower concentrations of each preservative. (See J. N. Sofos, "Sorbate Food Preservatives," CRC Press, Florida (1989).) The ability to use lower concentrations of each preservative reduces any potential undesirable effects on product flavor.

In the preferred embodiment of the present invention, the previously frozen fruit is added to a premix of sodium benzoate and potassium sorbate. Due to its toxic effects at higher concentrations, the quantity of sodium benzoate will not exceed 0.1% by weight of the final fruit puree. Preferably, the quantity of each preservative ranges from 0.056% to 0.058%.

pH

The preservative effects of sodium benzoate and potassium sorbate are best exhibited in an acidic media; therefore, the pH of the fruit puree may be stabilized through the addition of certain edible acids. In the preferred embodiment of the present invention, citric acid or malic acid is added to the final fruit puree in sufficient quantities to maintain the desired pH range of 2.3 to 3.8. Other edible acids could also be used to obtain the desired pH, including, for example, ascorbic acid and tartaric acid.

No Heating Required

Contrary to commonly known and used fruit preservation methods, the novel method of the present invention requires no heating. Because the fruit is slowly thawed before processing, and because it is immediately added to the premix of preservatives, it is unnecessary to heat the fruit mix in order to prevent spoilage. The slow thaw, in combination with the treatment of a premix of potassium sorbate and sodium benzoate at an acidic pH, is sufficient to protect the puree from microbial growth and spoilage. The lower processing temperatures that can be utilized in this invention help to minimize the degradation of product quality, and also to decrease the total processing time.

Sweeteners

In order to maintain the puree's desired brix value, natural sweeteners are used in this invention. "Brix" is generally defined as the contained percentage of soluble solids, primarily composed of the natural sugars. In the present invention, sufficient quantities of fructose or sucrose sweeteners are added during processing to maintain the final product's desired brix level of 6.0 to 25.0. Preferably, fructose is used as the sweetener in this invention, generally in the form of high fructose corn syrup, and present in amounts ranging from about 0% to 3.70% by weight of the final fruit puree product. However, other sweeteners, natural or artificial, could be used to achieve the desired result.

Optional Ingredients

Other ingredients which may be used in this invention are flavoring and coloring agents. These agents may be natural or artificial. Because fruit is a natural product and will vary in taste from season to season, the use of these agents helps to maintain the product's desired taste, appearance, and consistency. Hence, the fruit puree will contain from about 0.0646% to 0.275% of the flavoring and coloring ingredients. Other optional ingredients also may be included.

Purified water is also used in this invention to ensure solubility of the preservatives. The water is purified through a water treatment system comprising various methods, and is free of chlorine, iron and other minerals after treatment.

Packaging

The final fruit puree of the present invention is packaged to prevent its exposure to air and light. Exposure to light can cause the puree to brown, and exposure to oxygen can result in spoilage. In the preferred embodiment of this invention, the fruit puree is packaged in a foil-lined bag in a box. After the bag is filled with puree, oxygen is evacuated from the bag by flushing the head space with nitrogen gas. However, the fruit puree may be packaged by other means that would prevent exposure to air and light.

Once the fruit puree has been packaged, it can be stored at 70° F. or below for at least 90 days.

PREFERRED METHOD OF PREPARATION

To maintain the microbial stability of this fruit puree, the frozen fruits and/or fruit juice concentrates used in this invention should be kept frozen in the original packaging until time of production. When the frozen fruit is to be processed, it is placed within a refrigerated environment at a temperature range of 40° to 50° F., and is slowly thawed over a period of eight to ten days, depending upon the type of fruit and packaging used. The fruit remains within its unopened original container during the thawing process. The previously frozen fruit is visually inspected for signs of any surface mold growth.

Prior to processing the previously frozen fruit, all equipment and any contact surfaces are sanitized using an approved industry method. Purified water is metered into the sanitized mix tank. Equal parts of sodium benzoate and potassium sorbate preservatives are then dissolved in the purified water to form a premix. After the preservative premix has completely dissolved, high fructose corn syrup or sucrose sweeteners may be added to the mix tank.

After these agents are added, the previously frozen fruit is added to the mix tank and mixed thoroughly with the other ingredients. If whole fruit was used, the fruit will be liquified shortly before incorporating the fruit into the mix tank. At this point in the process, flavoring and coloring agents may be added to achieve the desired taste, color and consistency in the final fruit puree.

Once the ingredients have been thoroughly combined, the pH of the mixture will be tested. If necessary, citric acid or malic acid is used to adjust the pH to the range of 2.3 to 3.8, depending on the type of fruit puree. The final fruit puree mix can also be analyzed for brix value.

The final fruit puree is packaged in a foil-lined bag in a box in order to prevent exposure to light and oxygen. The bag is filled with the puree, then the head space in the bag is flushed with nitrogen to evacuate any oxygen present. After the foil-lined bag is sealed, the packaged puree can be stored at 70° F. or below for at least 90 days.

The following are several variations of specific embodiments of the shelf-stable fruit puree and method for making the same. These examples are illustrative of the invention and are not intended to be limiting of it.

| Blueberry Fruit Puree | |
|---|---|
| Purified Water | 8.5 gal. |
| Sodium Benzoate | 0.5 lbs. |
| Potassium Sorbate | 0.5 lbs. |
| High Fructose Corn Syrup - Type 55 | 2.5 gal. |
| Blueberry Flavor with Color | 0.15 gal. |
| Blueberries | 89.0 lbs. |

Purified water is added to the sanitized mix tank, then sodium benzoate and potassium sorbate are dissolved in the water to form a preservative premix. Sweetener, flavoring and coloring agents are then added to the premix of preservatives and thoroughly mixed. Previously frozen blueberries which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Strawberry Fruit Puree | |
| --- | --- |
| Purified Water | 8.326 gal. |
| Sodium Benzoate | 0.5 lbs. |
| Potassium Sorbate | 0.5 lbs. |
| High Fructose Corn Syrup - Type 55 | 2.75 gal. |
| Strawberry Flavor | 0.264 gal. |
| Strawberries | 761.2 lbs. |

Purified water is added to the sanitized mix tank, then sodium benzoate and potassium sorbate are dissolved in the water to form a preservative premix. Sweetener and flavoring agents are then added to the premix of preservatives and thoroughly mixed. Previously frozen strawberries which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Raspberry Fruit Puree | |
| --- | --- |
| Purified Water | 10.0 gal. |
| Sodium Benzoate | 0.5 gal. |
| Potassium Sorbate | 0.5 gal. |
| High Fructose Corn Syrup - Type 55 | 2.5 gal. |
| Raspberry Flavor | 0.26 gal. |
| Raspberries | 754.25 lbs. |

Purified water is added to the sanitized mix tank, then sodium benzoate and potassium sorbate are dissolved in the water to form a preservative premix. Sweetener and flavoring agents are then added to the premix of preservatives and thoroughly mixed. Previously frozen raspberries which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Kiwi Fruit Puree | |
| --- | --- |
| Purified Water | 8.326 gal. |
| Sodium Benzoate | 0.5 lbs. |
| Potassium Sorbate | 0.5 lbs. |
| High Fructose Corn Syrup - Type 55 | 2.5 gal. |
| Kiwi Flavor | 0.275 gal. |
| Kiwis | 88.6 lbs. |

Purified water is added to the sanitized mix tank, then sodium benzoate and potassium sorbate are dissolved in the water to form a preservative premix. Sweetener and flavoring agents are then added to the premix of preservatives and thoroughly mixed. Previously frozen kiwis which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Papaya Fruit Puree | |
| --- | --- |
| Purified Water | 10.0 gal. |
| Sodium Benzoate | 0.5 lbs. |
| Potassium Sorbate | 0.5 lbs. |
| High Fructose Corn Syrup - Type 55 | 2.5 gal. |
| Papaya Flavor | 0.26 gal. |
| Papayas | 87.43 lbs. | then sodium benzoate and potassium sorbate are dissolved in the water to form a preservative premix. Sweetener and flavoring agents are then added to the premix of preservatives and thoroughly mixed. Previously frozen papayas which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Mango Fruit Puree | |
| --- | --- |
| Purified Water | 8.5 gal. |
| Sodium Benzoate | 0.5 lbs. |
| Potassium Sorbate | 0.5 lbs. |
| High Fructose Corn Syrup - Type 55 | 2.5 gal. |
| Mango Flavor | 0.15 gal. |
| Mango | 89.0 lbs. |

Purified water is added to the sanitized mix tanks then sodium benzoate and potassium sorbate are dissolved in the water to form a preservative premix. Sweetener and flavoring agents are then added to the premix of preservatives and thoroughly mixed. Previously frozen mangos which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

| Pineapple Fruit Puree | |
| --- | --- |
| Purified Water | 43.93 gal. |
| Sodium Benzoate | 0.5 lbs. |
| Potassium Sorbate | 0.5 lbs. |
| Pineapple Juice Concentrate | 14.0 gal. |
| Pineapple Flavor | 0.074 gal. |
| Pineapple Chunks | 41.98 lbs. |

Purified water is added to the sanitized mix tank, then sodium benzoate and potassium sorbate are dissolved in the water to form a preservative premix. Pineapple juice concentrate and flavoring agents are then added to the premix of preservatives and thoroughly mixed. Previously frozen pineapples which have been slowly thawed in their original unopened containers are then added to the preservative/sweetener mix, and then mixed thoroughly. The pH is tested and adjusted with edible acid if necessary to bring the pH of the final puree within the desired range of 2.3 to 3.8.

The shelf-stable fruit puree produced by this new method can be added as flavoring to yogurts, smoothies and frozen drinks. It can be seen that the objects of the invention have been achieved. Only the best mode and preferred embodiment of the invention has been presented and described in detail, but it is to be understood and appreciated that the invention is not limited thereto and thereby.

I claim:

1. A method for producing a shelf-stable fruit puree, comprising the steps of: slowly thawing at least one variety of frozen fruit at a defined temperature over a period of time of at least one day to form a fruit base; preparing a premix of preservatives dissolved in water; adding the fruit base to said premix of preservatives to form a fruit-preservative mixture; and adjusting the pH of said fruit-preservative mixture with edible acid to maintain a pH in the range of 2.3 to 3.8.

2. The method of claim 1, wherein said frozen fruit is selected from the group consisting of apricots, blueberries, blackberries, boysenberries, cherries, guavas, kiwis, mangos, papayas, peaches, pineapples, strawberries and raspberries.

3. The method of claim 1, wherein said frozen fruit; remains frozen in its original container during the step of slowly thawing the frozen fruit.

4. The method of claim 1, wherein said step of slowly thawing the frozen fruit is accomplished by placing said frozen fruit in a refrigerated environment at a temperature of between 40° to 50° F. for between eight to ten days.

5. The method of claim 1, further comprising the step of sanitizing all equipment and contact surfaces used to prepare said fruit puree by an approved industry method prior to said slowly thawing step.

6. The method of claim 1, wherein said preservatives are sodium benzoate and potassium sorbate, present in approximately equal quantities.

7. The method of claim 6, wherein the quantity of said preservatives ranges from 0.056% to 0.058% of the total weight of the final fruit puree.

8. The method of claim 1, wherein said edible acid is selected from the group consisting of ascorbic acid, citric acid, malic acid and tartaric acid.

9. The method of claim 1, further comprising the step of adding to the premix of preservatives at least one natural sweetener, selected from the group consisting of sucrose, fructose, glucose, high fructose corn syrup, and liquid fructose.

10. The method of claim 1, wherein flavoring and coloring agents may be added to said premix of preservatives in sufficient amounts to maintain a desired flavor, color and consistency.

11. The method of claim 1, further comprising the steps of: placing said fruit puree into a foil-lined bag; flushing the head space in said bag with nitrogen gas to evacuate oxygen; and sealing said bag to prevent subsequent exposure to light and air.

12. A shelf-stable fruit puree prepared by the method comprising: slowly thawing at least one variety of frozen fruit at a defined temperature over a period of time of at least one day to form a fruit base; preparing a premix of preservatives dissolved in water; adding the fruit base to said premix of preservatives to form a fruit-preservative mixture; and adjusting the pH of said fruit-preservative mixture with edible acid to maintain a pH in the range of 2.3 to 3.8.

13. The shelf-stable fruit puree of claim 12, wherein said fruit puree has a brix value between 6.0 and 25.0.

14. The shelf-stable fruit puree of claim 12, wherein said frozen fruit is selected from the group consisting of apricots, blueberries, blackberries, boysenberries, cherries, guavas, kiwis, mangos, papayas, peaches, pineapples, strawberries, and raspberries.

15. The shelf-stable fruit puree of claim 12, wherein said preservatives are sodium benzoate and potassium sorbate, present in approximately equal quantities.

16. The shelf-stable fruit puree of claim 15, wherein the quantity of said preservatives ranges from 0.056% to 0.058% of the total weight of the final fruit puree.

17. The shelf-stable fruit puree of claim 12, wherein said edible acid is selected from the group consisting of ascorbic acid, citric acid, malic acid and tartaric acid.

18. The shelf-stable fruit puree of claim 12, wherein said puree is sweetened with at least one natural sweetener, selected from the group consisting of sucrose, fructose, glucose, high fructose corn syrup, liquid fructose, or mixtures thereof.

* * * * *